United States Patent
Johnson

(10) Patent No.: US 6,332,011 B1
(45) Date of Patent: Dec. 18, 2001

(54) ULTRASONIC EXAMINATION OF SHROUD WELD FROM TOP OF SHROUD FLANGE RING

(75) Inventor: Paul Johnson, Iron Station, NC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/510,404

(22) Filed: Feb. 22, 2000

(51) Int. Cl.⁷ .................................................. G21C 17/003
(52) U.S. Cl. .............................. 376/249; 73/622; 228/104
(58) Field of Search ................................... 376/249, 252; 228/104; 73/86, 622, 623, 850, 865.8

(56) References Cited

U.S. PATENT DOCUMENTS 3,988,922 * 11/1976 Clark et al. ...................... 376/249 X
4,302,286 * 11/1981 Lefebvre et al. ..................... 376/249
5,009,105 * 4/1991 Richardson et al. ............. 376/249 X
5,784,425 * 7/1998 Morlan ................................. 376/249

* cited by examiner

Primary Examiner—Robert P. Swiatek
(74) Attorney, Agent, or Firm—Armstrong Teasdale LLP

(57) ABSTRACT

A method of inspecting the H1 weld between the shroud head flange and the upper shroud section utilizing ultrasonic scanning includes the steps of positioning a phased array ultrasonic probe on a top surface of the shroud head flange, emitting an ultrasonic beam from the ultrasonic probe, electronically steering the ultrasonic beam to scan the weld joining the shroud head flange and the upper shroud section with the beam moving from an outer surface of the shroud head flange to an inner surface of the shroud head flange, and acquiring scan data over the length of the scan. The ultrasonic probe is moved circumferentially along the top surface of the shroud head flange in increments of between about 0.05 inch to about 0.5 inch with the H1 weld ultrasonically scanned after each incremental move.

20 Claims, 3 Drawing Sheets

ULTRASONIC EXAMINATION OF SHROUD WELD FROM TOP OF SHROUD FLANGE RING

BACKGROUND OF THE INVENTION

This invention relates generally to examination of nuclear reactors, and more particularly, to the examination of a top weld of a core shroud of a boiling water nuclear reactor.

A reactor pressure vessel (RPV) of a boiling water reactor (BWR) typically has a generally cylindrical shape and is closed at both ends, e.g., by a bottom head and a removable top head. A top guide, sometimes referred to as a grid is spaced above a core plate within the RPV. A core shroud, or shroud, surrounds the core plate and is supported by a shroud support structure. The core shroud is a reactor coolant flow partition and structural support for the core components. Particularly, the shroud has a generally cylindrical shape and surrounds both the core plate and the top guide. A removable shroud head is coupled to a shroud head flange at the top of the shroud.

The shroud, due to its large size, is formed by welding a plurality of stainless steel cylindrical sections together. Specifically, respective ends of adjacent shroud sections are joined with a circumferential weld. During operation of the reactor, the circumferential weld joints may experience intergranular stress corrosion cracking (IGSCC) and irradiation-assisted stress corrosion cracking (IASCC) in weld heat affected zones which can diminish the structural integrity of the shroud. In particular, lateral seismic/dynamic loading could cause relative displacements at cracked weld locations, which could produce large core flow leakage and misalignment of the core that could prevent control rod insertion and a safe shutdown.

Known methods of inspecting the circumferential shroud welds for IGSCC and IASCC utilize ultrasonic probes positioned on the shroud outer surface at the weld joint. A series of scans are performed while projecting the ultrasonic beam through the weld from the outer side of the shroud to the inner side of the shroud. Some methods position the probe on the inner surface of the shroud and project the ultrasonic beam from the inner surface of the shroud to the outer surface of the shroud. The weld between the shroud head flange and the upper shroud section, sometimes referred to as an H1 weld, is very difficult to access for inspection because of the plurality of shroud head locking lugs located around the outer surface of the shroud head flange which limits access to the weld from the outer surface of the shroud. Typically, less than 80% of the weld area can be examined. Additionally, because the shroud head flange extends radially inward, a probe cannot easily be placed against the weld between the flange and the upper shroud section on the inner surface of the shroud. Placing probes below the weld under the flange ledge and performing scans of the weld and upper heat affected zone by directing the ultasonic sound beam through the weld from the lower side has produced unreliable detection readings.

It would be desirable to provide a method of inspecting the H1 weld between the shroud head flange and the upper shroud section that is reliable and that reliably examines greater than 80% of the weld circumference.

BRIEF SUMMARY OF THE INVENTION

In an exemplary embodiment, a method of inspecting an H1 weld between a shroud head flange and an upper shroud section, and an upper heat affected zone of the H1 weld includes the steps of positioning a phased array ultrasonic probe on a top surface of the shroud head flange, emitting an ultrasonic sound beam from the ultrasonic probe, electronically steering the ultrasonic sound beam to scan the weld joining the shroud head flange and the upper shroud section with the beam moving from an outer surface of the shroud to an inner surface of the shroud, and acquiring scan data over a length of the scan. The ultrasonic probe is then incrementally moved circumferentially along the top surface of the shroud head flange and the weld is again ultrasonically scanned. The ultrasonic probe is continuously moved circumferentially along the top surface of the shroud head flange in increments of between about 0.05 inch to about 1.0 inch with the H1 weld ultrasonically scanned after each incremental move.

Initially, the ultrasonic beam is focused so that the focal point of the beam aligns with an upper fusion line of the weld and the outer surface of the shroud head flange. The beam is then repeatedly refocused so that the beam focal point moves along the upper fusion line of the weld from the outer surface of the shroud head flange to the inner surface of the shroud head flange in discrete increments. In one embodiment the beam focal point moves in increments of about 0.01 inch to about 0.5 inch.

After the ultrasonic probe has scanned the weld at the initial position on the shroud head flange, the ultrasonic probe is incrementally moved circumferentially along the top surface of the shroud head flange. At each predetermined incremental move of the probe the width of the weld is scanned by focusing the beam and moving the focal point incrementally along the fusion line as described above. Scans are performed at each incremental distance the probe is moved until the probe has traversed the complete circumference of the circumferential weld, or any desired portion of the circumference of the weld.

The above described method provides for reliable examination of greater than 80% of the H1 weld circumference because the ultrasonic probe placement and movement are not restricted by the shroud head locking lugs that are located on the outer surface of the shroud head flange. The method provides an examination of the heat affected zone of the weld extending from the upper fusion line of the weld to about 0.5 inch above the upper fusion line. Further, the method provides for detection, length and through-wall sizing of surface-connected planar flaws within the weld metal, heat affected zone, and adjacent base metal material. The planar flaws resulting from IGSCC and IASCC. Also, the above described method can be used for the detection and sizing of cracking associated with attachment welds of the shroud head locking lugs.

DETAILED DESCRIPTION OF THE INVENTION

Figure 1:
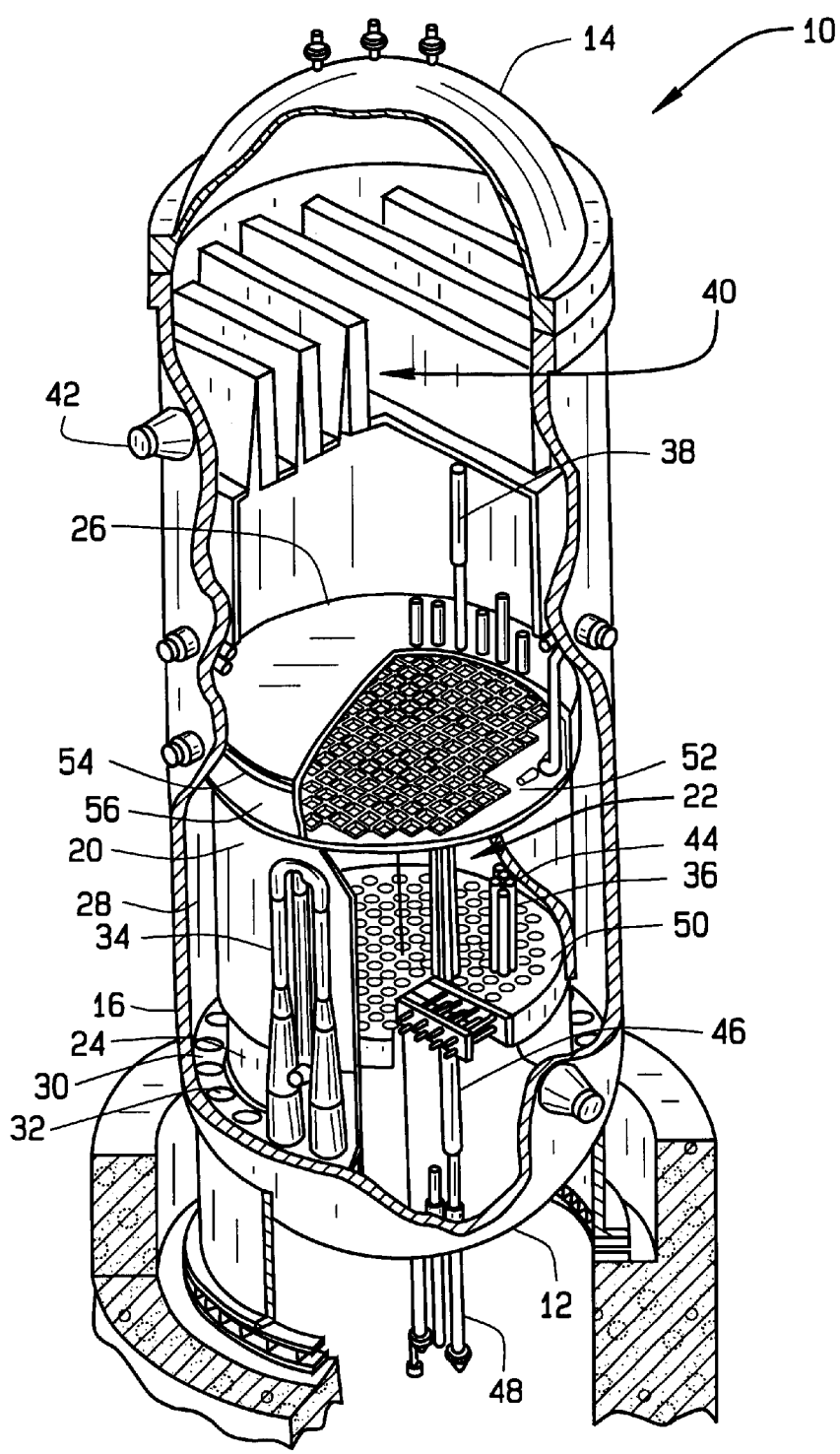
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump assembly 34. Jet pump assemblies 34 are circumferentially distributed around core shroud 20.

Heat is generated within core 22, which includes fuel bundles 36 of fissionable material. Water circulated up through core 22 is at least partially converted to steam. Steam separators 38 separate steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate 50 located at the base of core 22. A top guide 52 aligns fuel bundles 36 as they are lowered into core 22. Core plate 50 and top guide 52 are supported by core shroud 20.

Figure 2:
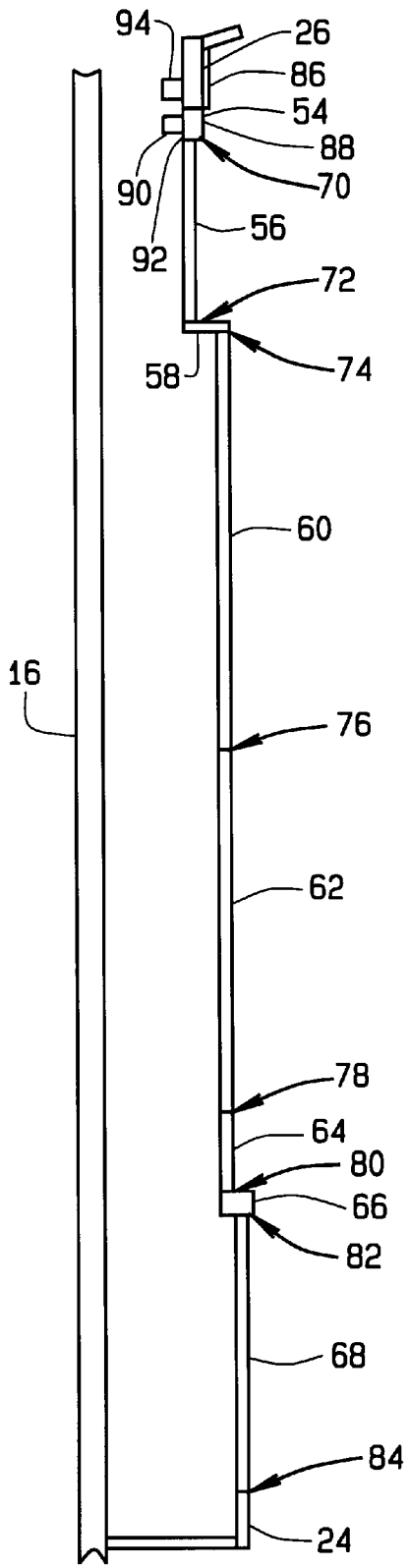
FIG. 2 is an enlarged sectional view of the shroud shown in FIG. 1.

FIG. 2 is an enlarged sectional view of shroud 20. Shroud 20 includes a shroud head flange 54, an upper shroud section 56, a top guide support 58, mid shroud sections 60, 62, and 64, a core plate support 66, and a lower shroud section 68. Circumferential welds 70, 72, 74, 76, 78, 80, and 82 couple the shroud elements together. A circumferential weld 84 attaches lower shroud section 68 to shroud support 24. Welds 70, 72, 74, 76, 78, 80, 82, and 84 are sometimes referred to as welds H1, H2, H3, H4, H5, H6A, H6B, and H7 respectively. A steam dam 86 is attached to inner surface 88 of shroud head flange 54. A plurality of shroud head lugs 90 are attached to an outer surface 92 of shroud head flange 54. Shroud head lugs 90 are spaced around the circumference of shroud head flange 54. Companion shroud head lugs 94 are attached to shroud head 26. Shroud head lugs 94 are located on shroud head 26 to be alignable with shroud head lugs 90 located on shroud head flange 54. Shroud head bolts (not shown) engage aligned shroud head lugs 90 and 94 to couple shroud head 26 to shroud 20.

Figure 3:
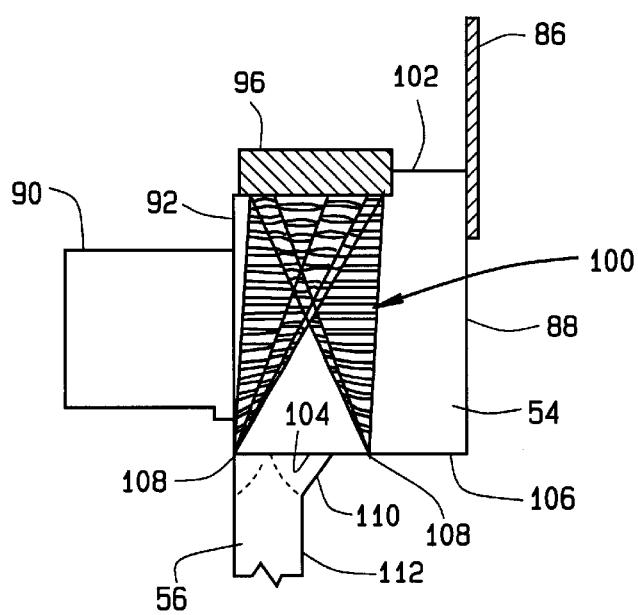
FIG. 3 is a side view of a phased array probe positioned on top of the shroud head flange shown in FIG. 2 in accordance with an embodiment of the present invention.
Figure 4:
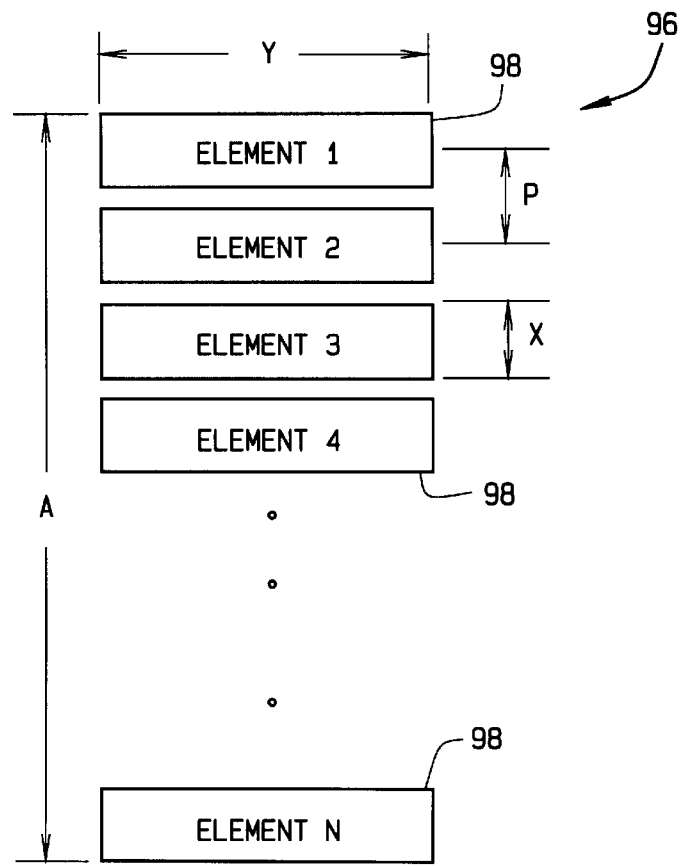
FIG. 4 is a schematic top view of the phased array probe shown in FIG. 3.

FIG. 3 is a side view of a phased array probe 96 positioned on top of shroud head flange 54 in accordance with an exemplary embodiment of the present invention. FIG. 4 is a schematic top view of probe 96. Referring to FIGS. 3 and 4, phased array probe 96 contains one linear array transducer having a plurality of elements 98 which emits an ultrasonic sound beam 100. The basic parameters of phased array probe 96 are defined as frequency, aperture A, element size X, element width Y, pitch or element spacing P, and number of elements 98.

A suitable transducer frequency is 2 MHz for the material type and thickness of shroud 20. However, other transducer frequencies can be used for shrouds manufactured from other material types. Additionally, testing has shown that a transducer frequency of 2 MHz is useful for detection and sizing of Intergranular Stress Corrosion Cracking (ISCC). In this exemplary embodiment, shroud 20 is formed from stainless steel. However, other useful materials such as, for example, Ni—Cr—Fe alloy X-750 steel, may be used.

The element pitch is determined by calculating the acoustic aperture A needed to focus beam 100 at the required sound path and dividing this value by the total number of elements. The size X of elements 98 is set as the maximum possible per the pitch. The width Y of elements 98 is determined by calculating the effective diameter for a near field of 6 inches to give the smallest beam profile in the y-plane. The physical restrictions of the scanning surface must also be considered in determining the basic parameter values of probe 96.

To examine the heat affected zone (HAZ) of H1 weld 70, phased array ultrasonic probe 96 is positioned on an upper surface 102 of shroud head flange 54. Probe 96 is triggered to emit an ultrasonic sound beam 100 which is focused at a point on a line which coincides with the upper fusion line 104 of weld 70 and a lower surface 106 of shroud head flange 54. Focussing beam 100 on upper fusion line 104 permits inspection of the HAZ from upper fusion line 104 extending at least one half inch toward upper surface 102 of shroud head flange 54.

Probe 96 can electronically steer ultrasonic sound beam 100 to scan HI weld 70 with the beam moving from shroud head flange outer surface 92 to shroud head flange inner surface 88, and acquiring scan data over a length of the scan. Ultrasonic probe 96 is then incrementally moved circumferentially along upper surface 102 of shroud head flange 54 and weld 70 is again ultrasonically scanned. Ultrasonic probe 96 is continuously moved circumferentially along upper surface 102 of shroud head flange 54 in increments of between about 0.05 inch to about 1.0 inch with the H1 weld ultrasonically scanned after each incremental move. In another embodiment, ultrasonic probe 96 is continuously moved circumferentially along upper surface 102 of shroud head flange 54 in increments of between about 0.05 inch to about 0.5 inch with the H1 weld ultrasonically scanned after each incremental move. In still another embodiment, ultrasonic probe 96 is continuously moved circumferentially along upper surface 102 of shroud head flange 54 in increments of between about 0.05 inch to about 0.1 inch with the H1 weld ultrasonically scanned after each incremental move.

Initially, ultrasonic beam 100 is focused so that a focal point 108 of beam 100 aligns with upper fusion line 104 of weld 70 and outer surface 92 of shroud head flange 54. Beam 100 is then repeatedly refocused so that beam focal point 108 moves along upper fusion line 104 and lower surface 106 of shroud head flange 54 from outer surface 92 of shroud head flange 54 toward inner surface 88 of shroud head flange 54 in discrete increments. This electronic refocusing of beam 100 is achieved by programming the individual elements 98 to pulse at preset times in relation to the other elements 98. The programming or pulse sequence is known as a focal law. A set of focal laws is used to electronically repeatedly refocus, or electronically steer, ultrasonic beam 100 along upper fusion line 104 and lower surface 106 of shroud head flange 54. Beam focal point 108 moves from outer surface 92 to at least 0.5 inch past a weld fillet 110 located at the interface of an inner surface 112 of upper shroud section 56 and lower surface 106 of shroud head flange 56. In one embodiment, beam focal point 108 moves in increments of about 0.01 inch to about 0.5 inch. In another embodiment, beam focal point 108 moves in increments of about 0.02 inch to about 0.2 inch. In still another embodiment, beam focal point 108 moves in increments of about 0.05 inch to about 0.1 inch.

After ultrasonic probe 96 has scanned weld 70 at the initial position on shroud head flange 54, ultrasonic probe 96 is incrementally moved circumferentially along upper surface 102 of shroud head flange 54. At each predetermined incremental move of probe 96 the width of weld 70 is scanned by focusing beam 100 and moving focal point 108 incrementally along fusion line 104 as described above. Scans are performed at each incremental distance that probe 96 is moved until probe 96 has traversed the complete circumference of circumferential weld 70, or any desired portion of the circumference of weld 70.

The above described method provides for reliable examination of greater than 80% of the circumference of H1 weld 70 because ultrasonic probe 96 placement and movement are not restricted by shroud head locking lugs 90 that are located on outer surface 92 of shroud head flange 54. The method provides an examination of the heat affected zone of weld 70 extending from upper fusion line 104 of weld 70 to about 0.5 inch above upper fusion line 104. Further, the method provides for detection, length and through-wall sizing of surface-connected planar flaws within the weld metal, heat affected zone, and adjacent base metal material. In addition, because ultrasonic beam 100 is electronically steered along the scan path, mechanical manipulation of probe 96 occurs in a single axis, which simplifies probe manipulator design and construction.

While the invention has been described and illustrated in terms of various specific embodiments, those skilled in the art will recognize that the invention can be practiced with modification within the spirit and scope of the claims.

What is claimed is:

1. A method of scanning a shroud weld in a nuclear reactor pressure vessel, the reactor pressure vessel comprising a shroud comprising an upper shroud section and a shroud head flange welded to one end of the upper shroud section, said method comprising the steps of:

positioning a phased array ultrasonic probe on an upper surface of the shroud head flange;

emitting an ultrasonic beam from the ultrasonic probe;

electronically steering the ultrasonic beam to scan a weld joining the shroud head flange and the upper shroud section, the beam moving from an outer surface of the shroud head flange toward an inner surface of the shroud head flange; and acquiring scan data over a length of the scan.

2. A method in accordance with claim 1 further comprising the steps of:

incrementally moving the phased array ultrasonic probe circumferentially along the upper surface of the shroud head flange;

emitting an ultrasonic beam from the ultrasonic probe;

electronically steering the ultrasonic sound beam to scan the weld joining the shroud head flange and the upper shroud section, the beam moving from an outer surface of the shroud head flange toward an inner surface of the shroud head flange; and acquiring scan data over a length of the scan.

3. A method in accordance with claim 2 further comprising the step of repeating, until a desired portion of the circumferential weld is scanned, said steps of:

incrementally moving the phased array ultrasonic probe circumferentially along the upper surface of the shroud head flange;

emitting an ultrasonic beam from the ultrasonic probe;

electronically steering the ultrasonic beam to scan the weld joining the shroud head flange and the upper shroud section, the beam moving from an outer surface of the shroud head flange toward an inner surface of the shroud head flange; and acquiring scan data over a length of the scan.

4. A method in accordance with claim 3 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 1.0 inch.

5. A method in accordance with claim 4 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 0.5 inch.

6. A method in accordance with claim 5 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 0.1 inch.

7. A method in accordance with claim 1 wherein emitting an ultrasonic beam from the ultrasonic probe comprises the step of focusing the ultrasonic beam so that the focal point of the beam aligns with an upper fusion line of the weld and a lower surface of the shroud head flange.

8. A method in accordance with claim 7 wherein electronically steering the ultrasonic beam to scan the weld joining the shroud head flange and the upper shroud section comprises the steps of:

focusing the ultrasonic beam so that the focal point of the beam aligns with the upper fusion line of the weld and the outer surface of the shroud head flange; and repeatedly refocusing the beam so that the beam focal point moves along the upper fusion line of the weld and the lower surface of the shroud head flange from the outer surface of the shroud head flange to at least 0.5 inch past a weld fillet located at the intersection of the inner surface of the upper shroud section and the lower surface of the shroud head flange in discrete increments.

9. A method in accordance with claim 8 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.01 inch to about 0.5 inch.

10. A method in accordance with claim 9 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.02 inch to about 0.2 inch.

11. A method in accordance with claim 10 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.05 inch to about 0.1 inch.

12. A method of scanning a shroud weld in a nuclear reactor pressure vessel, the reactor pressure vessel comprising a shroud comprising an upper shroud section and a shroud head flange connected to the upper shroud section with a weld, said method comprising the steps of:

(a) positioning a phased array ultrasonic probe on an upper surface of the shroud head flange;

(b) emitting an ultrasonic beam from the ultrasonic probe;

(c) electronically steering the ultrasonic beam to scan the weld joining the shroud head flange and the upper shroud section, the beam moving from an outer surface of the shroud head flange toward an inner surface of the shroud head flange;

(d) acquiring scan data over a length of the scan;

(e) incrementally moving the phased array ultrasonic probe circumferentially along the upper surface of the shroud head flange;

(f) emitting an ultrasonic beam from the ultrasonic probe;

(g) electronically steering the ultrasonic beam to scan the weld joining the shroud head flange and the upper shroud section, the beam moving from an outer surface of the shroud head flange toward an inner surface of the shroud head flange;

(h) acquiring scan data over a length of the scan; and (i) repeating said steps (e), (f), and (g) until the desired portion of the circumferential weld is scanned.

13. A method in accordance with claim 12 wherein emitting an ultrasonic beam from the ultrasonic probe comprises the step of focusing the ultrasonic beam so that the focal point of the beam aligns with an upper fusion line of the weld and a lower surface of the shroud head flange.

14. A method in accordance with claim 13 wherein electronically steering the ultrasonic beam to scan the weld joining the shroud head flange and the upper shroud section comprises the steps of:

focusing the ultrasonic beam so that the focal point of the beam aligns with the upper fusion line of the weld and the outer surface of the shroud head flange; and repeatedly refocusing the beam so that the beam focal point moves along the upper fusion line of the weld and the lower surface of the shroud head flange from the outer surface of the shroud head flange to at least 0.5 inch past a weld fillet located at the intersection of the inner surface of the upper shroud section and the lower surface of the shroud head flange in discrete increments.

15. A method in accordance with claim 14 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.01 inch to about 0.5 inch.

16. A method in accordance with claim 15 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.02 inch to about 0.2 inch.

17. A method in accordance with claim 16 wherein repeatedly refocusing the beam so that the beam focal point moves along the upper fusion line of the weld and the lower surface of the shroud head flange comprises the step of repeatedly refocusing the beam so that the beam focal point moves along the upper fusion line of the weld and the lower surface of the shroud head flange in increments of about 0.05 inch to about 0.1 inch.

18. A method in accordance with claim 12 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 1.0 inch.

19. A method in accordance with claim 18 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 0.5 inch.

20. A method in accordance with claim 19 wherein incrementally moving the phased array ultrasonic probe circumferentially along the upper surface of the shroud head flange comprises the step of moving the phased array ultrasonic probe circumferentially along the upper surface of the shroud head flange in increments of about 0.05 inch to about 0.1 inch.

* * * * *